United States Patent
Cheng et al.

(10) Patent No.: US 11,223,486 B2
(45) Date of Patent: Jan. 11, 2022

(54) DIGITAL SIGNATURE METHOD, DEVICE, AND SYSTEM

(71) Applicant: SHENZHEN OLYM INFORMATION SECURITY TECHNOLOGY CO., LTD., Shenzhen (CN)

(72) Inventors: Zhaohui Cheng, Shenzhen (CN); Feng Du, Shenzhen (CN)

(73) Assignee: SHENZHEN OLYM INFORMATION SECURITY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/644,951

(22) PCT Filed: Dec. 18, 2017

(86) PCT No.: PCT/CN2017/117023
§ 371 (c)(1),
(2) Date: Mar. 5, 2020

(87) PCT Pub. No.: WO2019/047418
PCT Pub. Date: Mar. 14, 2019

(65) Prior Publication Data
US 2021/0152370 A1   May 20, 2021

(30) Foreign Application Priority Data
Sep. 5, 2017 (CN) .......................... 201710792638.7

(51) Int. Cl.
*H04L 9/32* (2006.01)
*H04L 9/08* (2006.01)
*H04L 9/30* (2006.01)

(52) U.S. Cl.
CPC .......... *H04L 9/3252* (2013.01); *H04L 9/0866* (2013.01); *H04L 9/0869* (2013.01); *H04L 9/3073* (2013.01); *H04L 9/3242* (2013.01)

(58) Field of Classification Search
CPC ... H04L 9/3252; H04L 9/0866; H04L 9/0869; H04L 9/3073; H04L 9/3242
See application file for complete search history.

(56) References Cited

U.S. PATENT DOCUMENTS

| 8,467,535 B2 * | 6/2013 | Struik .................. H04L 9/3252 380/282 |
| 8,850,199 B2 * | 9/2014 | Zaverucha ........... H04L 9/3268 713/168 |

(Continued)

FOREIGN PATENT DOCUMENTS

| CA | 2417770 C | * 10/2011 | ............. G06Q 20/00 |
| CN | 100401669 C | * 7/2008 | ........... H04L 9/3268 |

(Continued)

OTHER PUBLICATIONS

International Search Report for PCT/CN2017/117023.
(Continued)

*Primary Examiner* — Techane Gergiso

(57) ABSTRACT

A digital signature method, a device, and a system of the present invention can generate a partial signature private key T corresponding to a user by a key generation center using a digital signature algorithm based on the EC-Schnorr, and sign a message M by using a standard digital signature algorithm such as the ECDSA. In the calculation of generating the second part w of the partial signature private key T, a signature assignment R is used, and the signature assignment R is a hash digest of a message including at least a pre-signature Π and an ID of a signature side. When signing the message M and verifying the signature of the message M, the operation requiring M as input uses a concatenation of R and M as input. The present invention uses a mechanism to connect two signature algorithms to ensure that the constructed complete algorithm can effectively resist known attacks.

16 Claims, 8 Drawing Sheets

(56) References Cited

U.S. PATENT DOCUMENTS

| | | | |
|---|---|---|---|
| 9,053,370 B2 * | 6/2015 | Yoshioka | H04N 21/23418 |
| 2011/0055585 A1 * | 3/2011 | Lee | H04L 9/0844 |
| | | | 713/183 |
| 2017/0093816 A1 | 3/2017 | Tsai et al. | |

FOREIGN PATENT DOCUMENTS

| | | | | |
|---|---|---|---|---|
| CN | 101873307 A | * | 10/2010 | H04L 9/3247 |
| CN | 102201920 A | | 9/2011 | |
| CN | 104320259 A | | 1/2015 | |
| CN | 106936584 A | | 7/2017 | |
| CN | 107395370 A | | 11/2017 | |

OTHER PUBLICATIONS

International Publilcation for PCT/CN2017/117023.
Written Opinion of the International Search Authority for PCT/CN2017/117023.

* cited by examiner

DIGITAL SIGNATURE METHOD, DEVICE, AND SYSTEM

BACKGROUND

1. Technical Field

The present disclosure generally relates to digital signature technology and particularly to a digital signature method, a device, and a system.

2. Description of Related Art

Traditional public key systems use certificates to bind user identities and user-owned keys. The certificates can effectively prove the relationship between users and their keys, but the management of the certificates is complex. An identity-based cryptographic algorithm uses the user's identity and public information of a system to calculate the user's identification public key, the communication between users does not need to exchange the certificates or the public key. The advantage of such systems is simple management, but the disadvantage is that it has the property of key delegation, that is, there is a key generation center that can generate the private keys of all users. The certificateless public key system is somewhere in between these two systems, and the user's key is jointly generated by the user and the key generation center. The basic method is that a user provides a public key in a partial key 1 generated by the user, and an identification of the public key, to the key generation center, for a signature operation, and generating a partial key 2. After the user obtains the partial key 2 (signature result), a complete public-private key pair is generated by combining the partial key 1 generated by the user. Such systems need to ensure that even if an attacker forges a public key, without the user's private key, and the identity of the user cannot be forged for operations such as digital signature. The construction of this certificateless digital signature mechanism involves two signature algorithms. The first signature algorithm is executed by the key generation center to sign an identity submitted by the user. The second signature algorithm is executed by the user, and the user uses the private key in the complete public-private key pair to sign the signed message. But the security of a constructed certificateless digital signature mechanism cannot be ensured by simply combining standard signature algorithms such as EC-Schnorr and a message signature algorithm ECDSA. The security problem of a simple combination method can be found in the paper of Daniel R. L. Brown et al. "Security of ECQV-Certified ECDSA Against Passive Adversarie".

SUMMARY

The main purpose of the present invention is to provide a digital signature method, device, and a system that aim to solve the problem of security loopholes in the prior art.

In order to achieve the above-mentioned object of the present invention, the present invention provides a digital signature method, including:

a signature side randomly generating a key pair n and X, and submitting an identification ID of the signature side and X to a key generation center;

receiving a partial signature private key $T=(\Pi, w)$ corresponding to the identification ID of the signature side generated by the key generation center; and wherein, the $(\Pi, w)$ is a signature value obtained by the key generation center performing a digital signature method MA to sign the ID; the key generation center randomly generates a signature public-private key pair (P, ms), generates a pre-signature $\Pi$, then generates a hash digest as a signature assignment R, and finally generates a second part w of the signature value, wherein the hash digest of a message includes at least $\Pi$ and ID; and the key generation center takes P as a public parameter of a cryptosystem;

calculating and obtaining a signature key, pair (PX, S) by using the P, the ID, the T, the n, and the X;

signing a message M by using S as a signature private key to execute a digital signature method MB, generating a signature value U, and passing (U, PX) as a signature value of the message M signed by the signature side to a verifying side, or sending U as the signature value of the message M signed by the signature side to the verifying side and publishing PX; and wherein, during a process of signing the message M an operation requiring M as input uses a concatenation of R and M as input; and verifying, by the verifying side, a signature of the message M; wherein, the verifying side obtains PX, calculates a public key Q corresponding to S according to the P, the ID, and the PX, and verifies whether U is a valid signature of the message M signed based on a private key corresponding to the public key Q, according to a signature verification process of the digital signature method MB, wherein, during a process of verifying signature, an operation requiring M as input uses a concatenation of R and M as input.

Further, the digital signature method MA is a signature method based on a discrete logarithm problem; the key generation center is constructed based on the discrete logarithm problem, the key generation center selects a generator G of a cyclic group of order q and a random element [o]G in the cyclic group, wherein [o]G denotes the o multiple of G according to operation rules of the cyclic group;

ms in the signature public-private key pair (P, ms) is an integer ms randomly generated by the key generation center and satisfies $0<ms<q$, and $P=<G, H=[ms]G>$.

Further, before the step of calculating and obtaining the signature key pair (PX, S) by using the P, the ID, the T, the n, and the X, includes:

the signature side using the n to decrypt an information including w encrypted based on a standard asymmetric encryption algorithm by the key generation center, wherein, when the standard asymmetric encryption algorithm encrypts the information includes w, a used encryption public key is X.

Further, a method of the signature side randomly generating the key pair n and X, includes:

the signature side randomly generating an integer n which satisfies $0<n<q$, and calculating $X=[n]G$.

Further, the step of receiving the partial signature private key $T=(\Pi, w)$ corresponding to the identification. ID of the signature side generated by the key generation center, specifically includes:

randomly generating, by the key generation center, an integer k which satisfies $0<k<q$, or calculating and obtaining $k=HASH (F (ID, other information I), ms) \mod q$, the other information I including H and X, an operation of F being a hash operation or a string concatenation, wherein, HASH (F (ID, other information I), ms) is a hash digest for a concatenation of F(ID, other information I) and ms or ms and F(ID, other information I), or a HMAC result with ms as a secret key of message F(ID, other information I);

calculating, by the key generation center, the pre-signature $\Pi=[k]G \pm [n]G$;

calculating, by the key generation center, the signature assignment R=HASH (F (ID, other information A), Π), and the other information A including H;

calculating, by the key generation center, the second part of the signature value w=(k±R*ms) mod q or (R*k±ms) mod q;

generating, by the key generation center, the partial signature private key T=(Π, w);

receiving the partial signature private key T=(Π, w).

Further, the step of calculating and obtaining the signature key pair (PX, S) by using the P, the ID, the T, the n, and the X includes:

when w=(k±R*ms) mod q, S=(w±n) mod q, PX=Π, generating the signature key pair (PX, S), and the corresponding public key Q=Π±[R]H;

when w=(R*k±ms) mod q, S=(w±R*n) mod q, PX=Π, generating the signature key pair (PX, S), and the corresponding public key Q=[R]Π±H.

Further, the step of receiving the partial signature private key T=(Π, w) corresponding to the identification ID of the signature side generated by the key generation center, specifically includes:

randomly generating, by the key generation center, an integer k which satisfies 0<k<q, or calculating and obtaining k=HASH (F (ID, other information I), ms) mod q, the other information I including H and X, au operation of F being a hash operation or a string concatenation, wherein, HASH (F (ID, other information I), ms) is a hash digest for a concatenation of (F(ID, other information I) and ms or ms and F(ID, other information I), or a HMAC result with ms as a secret key of message F(ID, other information I);

calculating, by the key generation center, the pre-signature Π=[k]G;

calculating, by the key generation center, the signature assignment R=HASH (F (ID, other information A), Π) mod q, and the other information A including X and H;

calculating, by the key generation center, the second part of the signature value w=(k±R*ms) mod q or (R*k±ms) mod q;

generating, by the key generation center, the partial signature private key T=(Π, w);

receiving the partial signature private key T=(Π, w).

Further, the step of calculating and obtaining the signature key pair (PX, S) by using the P, the ID, the T, the n, and the X includes:

when w=(k±R*ms) mod q, S=(w±n) mod q, PX=(Π, X), generating the signature key pair (PX, S), and the corresponding public key Q=Π±X±[R]H;

when w=(R*k±ms) mod q, S=(w±R*n) mod q, PX=(Π, X), generating the signature key pair (PX, S), and the corresponding public key Q=[R](Π±X)±H.

The present invention also provides a digital signature device, including:

a generating sending unit, used for randomly generating, by a signature side, a key pair n and X and submitting an identification ID of the signature side and X to a key generation center;

a receiving unit, used for receiving a partial signature private key T=(Π, w) corresponding to the identification ID of the signature side generated by the key generation center; wherein, the (Π, w) is a signature value obtained by the key generation center performing a digital signature method MA to sign the ID; the key generation center randomly generates a signature public-private key pair (P, ms), generates a pre-signature Π, then generates a hash digest as a signature assignment R, and finally generates a second part w of the signature value, wherein the hash digest of a message includes at least Π and ID; and the key generation center takes P as a public parameter of a cryptosystem;

a calculating obtaining unit, used for calculating and obtaining a signature key pair (PX, S) by using the P, the ID, the T, the n, and the X;

a signing sending unit, used for signing a message M by using S as a signature private key to execute a digital signature method MB, generating a signature value U and passing (U, PX) as a signature value of the message M signed by the signature side to a verifying side, or sending U as the signature value of the message M signed by the signature side to the verifying side and publishing PX; and wherein, during a process of signing the message M, an operation requiring M as input uses a concatenation of R and M as input;

a verifying unit; used for verifying, by the verifying side, a signature of the message M; wherein, the verifying side obtains PX, calculates a public key Q corresponding to S according to the P, the ID, and the PX, and verifies whether U is a valid signature of the message M signed based on a private key corresponding to the public key Q, according to a signature verification process of the digital signature method MB, wherein, during a process of verifying signature, an operation requiring M as input uses a concatenation of R and M as input.

Further, the digital signature method MA is a signature method based on a discrete logarithm problem; the key generation center is constructed based on the discrete logarithm problem, the key generation center selects a generator G of a cyclic group of order q and a random element [o]G in the cyclic group, wherein, [o]G denotes the o multiple of G according to operation doles of the cyclic group;

ms in the signature public-private key pair (P, ms) is au integer ms randomly generated by the key generation center and satisfies 0<ms<q, and P=<G, H=[ms]G)>.

Further, the digital signature device further includes:

a decrypting unit, used for using, by the signature side, the n to decrypt an information including w encrypted based on a standard asymmetric encryption algorithm by the key generation center, wherein, when the standard asymmetric encryption algorithm encrypts the information includes w, a used encryption public key is X.

Further, the generating sending unit includes:

a generating calculating module, used for randomly generating an integer n which satisfies 0<n<q, and calculating X=[n]G.

Further, the receiving unit includes:

a first generating k module, used for randomly generating, by the key generation center, an integer k which satisfies 0<k<q, or calculating and obtaining k=HASH (F (ID, other information I), ms) mod q, the other information I including generating information of the cyclic group, G, H, and X, an operation of F being a hash operation or a string concatenation, wherein, HASH (F (ID, other information I), ms) is a hash digest for a concatenation of F(ID, other information I) and ms or ms and F(ID, other information I), or a HMAC result with ms as a secret key of message F(ID, other information I);

a first calculating Π module, used for calculating, by the key generation center, the pre-signature Π=[k]G±[n]G;

a first calculating R module, used for calculating, by the key generation center, the signature assignment R=HASH (F (ID, other information A), Π), and the other information A including H;

a first calculating w module, used for calculating, by the key generation center, the second part of the signature value w=(k±R*ms) mod q or (R*k±ms) mod q;

a first generating module, used for generating, by the key generation center, the partial signature private key $T=(\Pi, w)$;

a first receiving module, used for receiving the partial signature private key $T=(\Pi, w)$.

Further, the calculating obtaining unit includes:

a first calculating generating module, used for when $w=(k \pm R \text{ ms}) \mod q$, $S=(w \pm n) \mod q$, $PX=17$, generating the signature key pair $(PX, S)$, and the corresponding public key $Q=\Pi \pm [R]H$; and when $w=(R*k \pm ms) \mod q$, $S=(w \pm R*n) \mod q$, $PX=\Pi$, generating the signature key pair $(PX, S)$, and the corresponding public key $Q=[R]\Pi \pm H$.

Further, the receiving unit includes:

a second generating k module, used for randomly generating, by the key generation center, an integer k which satisfies $0<k<q$, or calculating and obtaining $k=\text{HASH} (F (ID, \text{other information I}), ms) \mod q$, the other information I including H and X, an operation of F being a hash operation or a string concatenation, wherein, HASH (F (ID, other it information I), ms) is a hash digest for a concatenation of F(ID, other information I) and is or is and F(ID, other information I), or a HMAC result with ms as a secret key of message F(ID, other information I);

a second calculating $\Pi$ module, used for calculating, by the key generation center, the pre-signature $\Pi=[k]G$;

a second calculating R module, used for calculating, by the key generation center, the signature assignment $R=\text{HASH} (F (ID, \text{other information A}), \Pi) \mod q$, and the other information A including X and H;

a second calculating w module, used for calculating, by the key generation center, the second part of the signature value $w=(k \pm R*ms) \mod q$ or $(R*k \pm ms) \mod q$;

a second generating module, used for generating, by the key generation center, the partial signature private key $T=(\Pi, w)$;

a second receiving module, used for receiving the partial signature private key $T=(\Pi, w)$.

Further, the calculating obtaining unit includes:

a second calculating generating module, used for when $w=(k \pm R*ms) \mod q$, $S=(w \pm n) \mod q$, $PX=(\Pi, X)$, generating the signature key pair $(PX, S)$, and the corresponding public key $Q=\Pi \pm X \pm [R]H$; and when $w=(R*k \pm ms) \mod q$, $S=(w \pm R*n) \mod q$, $PX=(\Pi, X)$, generating the signature key pair $(PX, S)$, and the corresponding public key $Q=[R](\Pi \pm X) \pm H$.

The present invention also provides a digital signature system, including: a signature side, a key generation center, and a verifying side; wherein the signature side randomly generates a key pair n and X, and submits an ID and X to the key generation center;

the key generation center performs a preset digital signature method MA to sign the identification ID, a process of signing the identification ID includes: the key generation center randomly generating a signature public-private key pair (P, ms), generating a pre-signature $\Pi$, generating a hash digest of a message including at least $\Pi$ and ID as a signature assignment R, finally generating the second part w of the signature value, obtaining a signature value $(\Pi, w)$ including two parts, taking the signature value as a partial signature private key $T=(\Pi, w)$, and sending the partial signature private key T to the signature side; and the key generation center further taking P as a public parameter of a cryptosystem;

the signature side calculates and obtains a signature key pair (PX, S) by using the P, the ID, the T, the n, and the X; signs a message M by using S as the signature private key to execute a digital signature method MB, generates a signature value U, and passes (U, PX) as a signature value of the message M signed by the signature side to the verifying side, or sends U as the signature value of the message M signed by the signature side to the verifying side and publishes PX; and wherein, during a process of signing the message M, an operation requiring the M as input uses a concatenation of R and M as input;

the verifying side verifies a signature of the message M; a process of verifying the signature of the message M includes: obtaining PX, calculating a public key Q corresponding to S according to the P, the ID, and the PX, and verifying whether U is a valid signature of the message M signed based on a private key corresponding to the public key Q, according to a signature verification process of the digital signature method MB, wherein, during the process of verifying signature, an operation requiring M as input uses a concatenation of R and M as input.

The digital signature method, the device, and the system of the present invention can use, for example, a digital signature algorithm based on the EC-Schnorr, as a signature algorithm of the key generation center, to generate the partial signature private key T corresponding to a user, and then use a standard digital signature algorithm, for example, the ECDSA, to sign the message M. In the calculation of generating the second part w of the signature private key T, the signature assignment R is used, and the signature assignment R is a hash digest of a message including at least the pre-signed signature $\Pi$ and the identification ID of the signature side, and when signing the message M, the operation requiring M as input uses a concatenation of the R and the M as input. In the verification process, a concatenation of the R and the M is also used as input in the operation that originally requires M as input, the security of signing is improved. The present invention uses a mechanism to connect two signature, algorithms to ensure that the constructed complete algorithm can effectively resist known attacks.

The realization, functional features and advantages of the present invention will be further described with reference to embodiments and drawings.

DETAILED DESCRIPTION

It should be understood that specific embodiments described herein are only used to explain the present invention and are not intended to limit the present invention.

Figure 1:
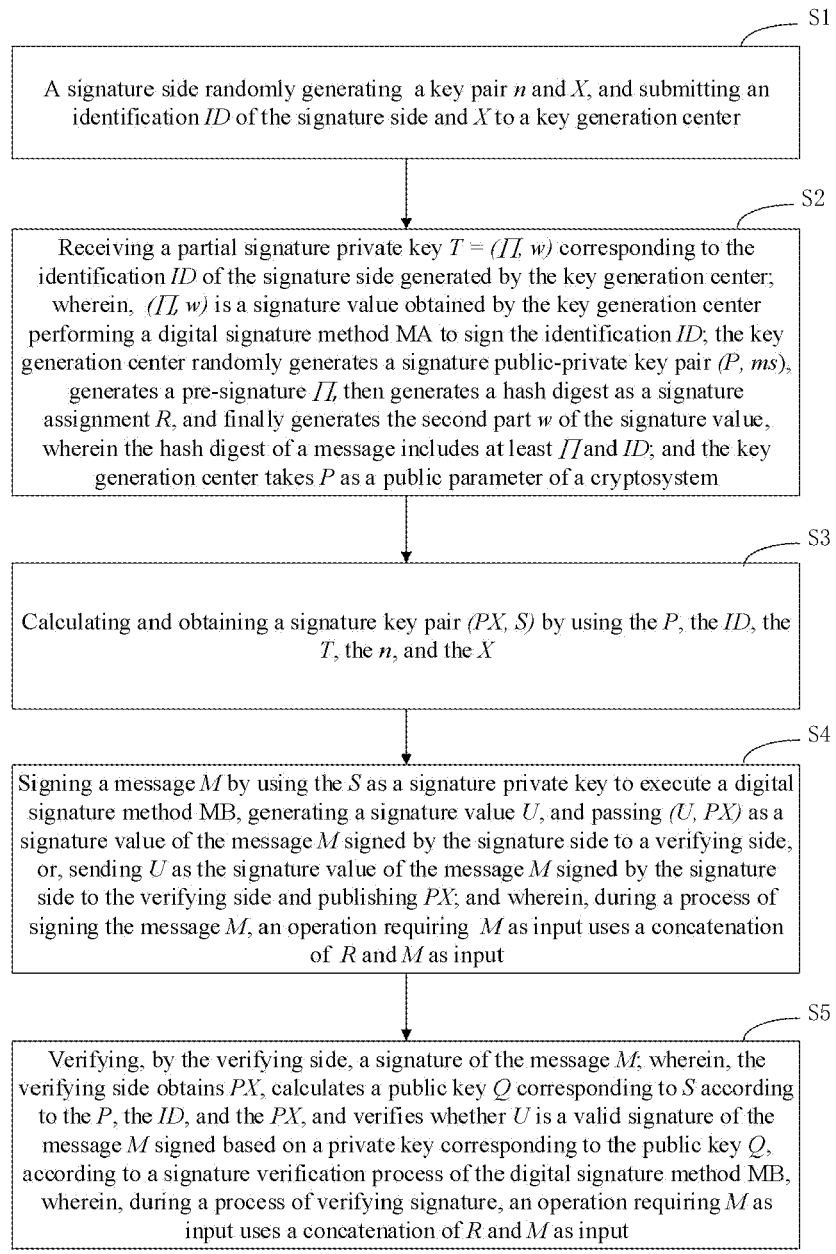
FIG. 1 is a flow chart of a digital signature method according to an embodiment of the present invention.

Referring to FIG. 1, an embodiment of the present invention provides a digital signature method, including steps:

S1, a signature side randomly generating a key pair, n and X, and submitting an identification ID of the signature side and X to a key generation center.

In the step S1, the signature side is a kind of intelligent device such as a mobile phone, a computer, a PDA, etc. The key generation center is a key, management center, which is an important part of a public key infrastructure. The key generation center provides key services such as key generation, storage, backup, update, recovery, and query, and the key management problems caused by large-scale cryptography application in the distributed enterprise application environment can be solved. The identification ID is an ID corresponding to the signature side, and an identification ID uniquely corresponds to a signature side.

S2, receiving a partial signature private key T=(Π, w) corresponding to the identification ID of the signature side generated by the key generation center; wherein, the (Π, w) is a signature value obtained by the key generation center performing a digital signature method MA to sign the ID; the key generation center randomly generates a signature public-private key pair (P, ms), generates a pre-signature Π, then generates a hash digest as a signature assignment R, and finally generates the second part w of the signature value, wherein the hash digest of a message includes at least Π and ID; and the key generation center takes P as a public parameter of a cryptosystem.

In the step S2, the digital signature method MA is a signature method based on a discrete logarithm problem. The key generation center is constructed based on the discrete logarithm problem, and the key generation center selects a generator G of a cyclic group of order q and a random element [o]G in the cyclic group, wherein, [o]G denotes the o multiple of G according to operation rules of the cyclic group. According to the system parameter P, the identification ID, and the PX disclosed above, the public key Q=[S]G corresponding to S as the private key can be calculated. The ms in the signature public-private key pair (P, ms) is an integer ms randomly generated by the key generation center, and satisfies 0<ms<Q, and P=<G, H=[ms]G>. In this step, the second part w of the partial signature private key T contains the signature assignment R (including at least the hash digest of Π and ID), in the subsequent signature process, the security of signature can be improved by adding signature assignment R.

S3, calculating and obtaining a signature key pair (PX, S) by using the P, the ID, the T, the n, and the X.

Before the step S3, the method further includes: the signature side using the n to decrypt an information including w encrypted based on a standard asymmetric encryption algorithm by the key generation center, wherein, when the standard asymmetric encryption algorithm encrypts the information includes w, a used, encryption public key is X. That is, the key generation center encrypts the partial signature private key T=(Π, w) sent to the signature side mainly by encrypting the information containing w, and its encryption method is the standard asymmetric encryption algorithm such as the ECIES and other encryption algorithms.

S4, sighing a message M by using S as a signature private key to execute a digital signature method MB, generating a signature value U, and passing (U, PX) as a signature value of the message M signed by the signature side to a verifying side, or sending U as the signature value of the message M signed by the signature side to the verifying side and publishing PX; and wherein, during a process of signing the message M, an operation requiring M as input uses a concatenation of R and M as input.

In the step S4, during the process of signing the message M, the operation requiring M as input uses a concatenation of R and M as input, the security of signing can be improved.

S5, verifying, by the verifying side, a signature of the message M; wherein, the verifying side obtains PX calculates a public key Q corresponding to S according to the P, the ID, and the PX, and verifies whether U is a valid signature of the message M signed based on a private key corresponding to the public key Q, according to a signature verification process of the digital signature method MB, wherein, during a process of verifying signature, an operation requiring M as input uses a concatenation of R and M as input.

In the step S5, in the verification process, similarly, a concatenation of the R and the M is also used as input in the operation that requires the M as input, and the security of signing is improved.

In the embodiment, the method of the signature side randomly generating the key pair n and X includes: the signature side randomly generating an integer n which satisfies 0<n<q, and calculating X=[n]G.

Figure 2:
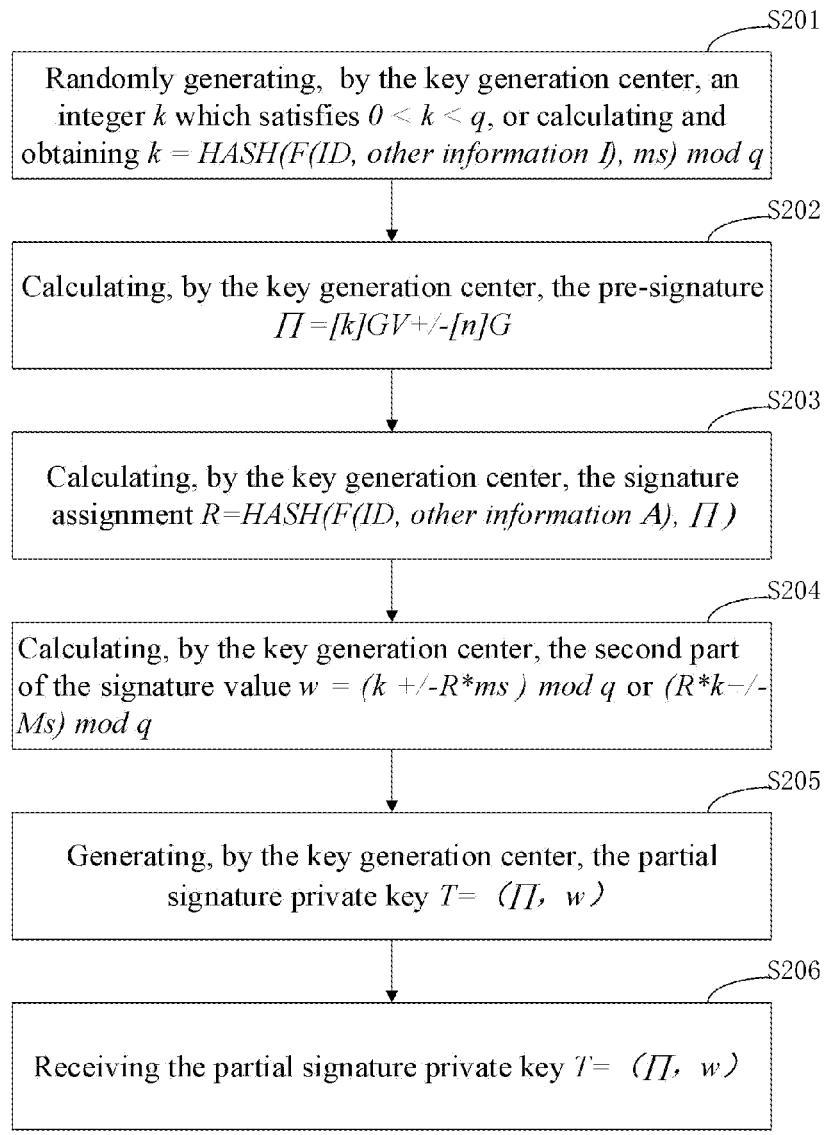
FIG. 2 is a flow chart of the step S2 in the digital signature method according to an embodiment of the present invention.

Referring to FIG. 2, in this embodiment, the step S2 of receiving the partial signature private key T=(Π, w) corresponding to the identification ID of the signature side generated by the key generation center, specifically includes:

S201, randomly generating, by the key generation center, an integer k which satisfies 0<k<q, or calculating and obtaining k=HASH (F (ID, other information I), ms) mod q, the other information I may including H and X, an operation of F being a hash operation or a string concatenation, wherein, HASH (F (ID, other information I), ms) is a hash digest for a concatenation of F(ID, other information I) and ms or ms and F(ID, other information I), or a HMAC result with ms as a secret key of message F(ID, other information I);

S202, calculating, by the key generation center, the pre-signature Π=[k]G±[n]G;

S203, calculating, by the key generation center, the signature assignment R=HASH (F (ID, other information A), Π), and the other information A including H;

S204, calculating, by the key generation center, the second part of the signature value w=(k±R*ms) mod q or (R*k±ms) mod q;

S205, generating, by the key generation center, the partial signature private key T=(Π, w);

S206, receiving the partial signature private key T=(Π, w).

In this embodiment, the step S3 of calculating and obtaining the signature key pair (PX, S) by using the P, the ID, the T, the n, and the X, includes:

S301, when w=(k±R*ms) mod q, S=(w±n) mod q, PX=Π, generating the signature key pair (PX, S), and the corresponding public key Q=Π±[R]H;

S302, when w=(R*k±ms) mod q, S=(w±R*n) mod q, PX=Π, generating the signature key pair (PX, S) and the corresponding public key Q=[R]Π±H.

Figure 3:
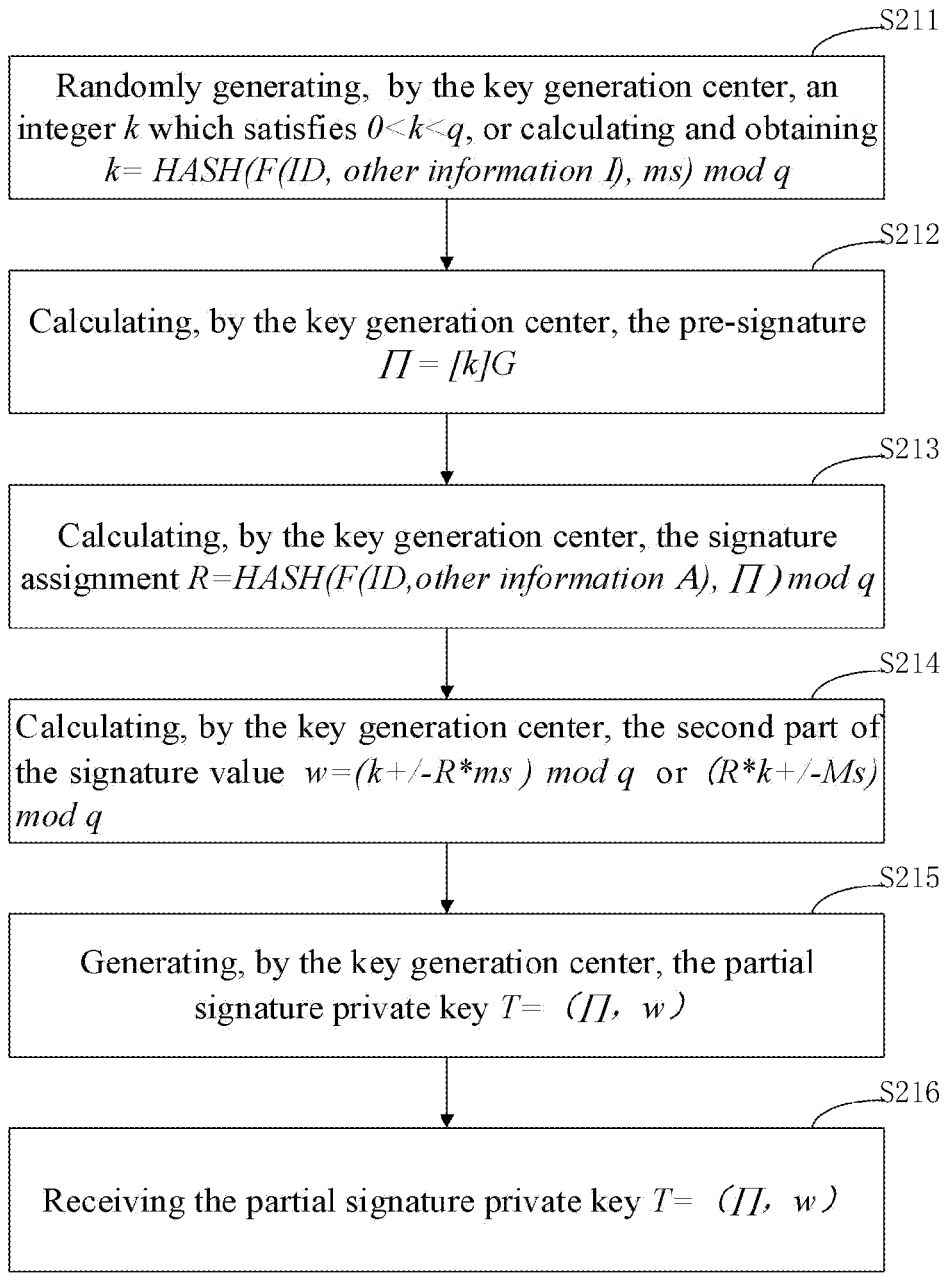
FIG. 3 is a flow chart of the step S2 in the digital signature method according to another embodiment of the present invention.

Referring to FIG. 3, in another embodiment, the step S2 of receiving the partial signature private key T=(Π, w) corresponding to the identification ID of the signature side generated by the key generation center, specifically includes:

S211, randomly generating, by the key generation center, an integer k which satisfies 0<k<q, or calculating and obtaining k=HASH (F (ID, other information I), ms) mod q, the other information I including H and X, an operation of F being a hash operation or a string concatenation, wherein, HASH (F (ID, other information I), ms) is a hash digest for a concatenation of F(ID, other information I) and ms or ms and F(ID, other information I), or a HMAC result with ms as a secret key of message F(ID, other information I);

S212, calculating, by the key generation center, the pre-signature $\Pi=[k]G$;

S213, calculating, by the key generation center, the signature assignment R=HASH (F (ID, other information A), $\Pi$) mod q, and the other information A including X and H;

S214, calculating, by the key generation center, the second part of the signature value $w=(k\pm R*ms)$ mod q or $(R*k\pm ms)$ mod q;

S215, generating, by the key generation center, the partial signature private key $T=(\Pi, w)$;

S216, receiving the partial signature private key $T=(\Pi, w)$.

In this embodiment, the step S3 of calculating and obtaining the signature key pair (PX, S) by using the P, the ID, the T, the n, and the X, includes:

S311, when $w=(k\pm R*ms)$ mod q, $S=(w\pm n)$ mod q, $PX=(\Pi, X)$, generating the signature key pair (PX; S), and the corresponding public key $Q=\Pi\pm X\pm[R]H$;

S312, when $w=(R*k\pm ms)$ mod q, $=(w\pm R*n)$ mod q, $PX=(\Pi, X)$, generating the signature key pair (PX, S) and the corresponding public key $Q=[R](\Pi\pm X)\pm H$.

The present invention also provides a first specific embodiment, a signature method thereof is a signature method based on the SM2, and the details of the signature method are as follows:

S110, a signature side randomly generates an integer n which satisfies $<n<q$, calculates $X=[n]G$, and provides the X and the signature side's own identification ID to a key generation center.

S120, the key generation center selects the EC-Schnorr signature algorithm as a signature method MA. A elliptic curve E: $Y^2=X^3+a*X+b$ specified in the SM2 standard is selected, a point group of order q on the elliptic curve E as the cyclic group is selected, the generator G is randomly selected, an integer ms satisfying $0<ms<q$ is randomly generated, $H=[ms]G$ is calculated, and a system parameter $P=<G, H=[ms]G>$ is set.

The steps of the key generation center generating the partial signature private key T corresponding to the ID are as follows:

A. the key generation center randomly generates an integer k satisfying $0<q<q$;

B. the key generation center calculates a pre-signature $\Pi=[k]G+[n]G$;

C. the key generation center calculates $Z=SM3$ $(ID\_LEN\|ID\|a\|b\|xG\|yG\|xQ\|yQ)$, and calculates a signature assignment value $R=SM3$ $(Z, x\Pi\|y\Pi)$ mod q, wherein, ID_LEN is the length of ID, xG, yG, etc. represent values of x-axis and y-axis corresponding to point G, etc.;

D. the key generation center calculates the second part of a signature value $w=(k-R*ms)$ mod q, correspondingly, a calculation process of Q is $Q=\Pi-[R]H$;

E. the key, generation center generates the partial signature private key $T=(\Pi, w)$.

S130, the signature side calculates $S=(w+n)$ mod q, sets $PX=\Pi$, generates a signature key pair $(\Pi, S)$, and uses the SM2 algorithm as MB to sign a message M. The step S130 includes the following steps:

A. calculating $Z=SM3$ $(ID\_LEN\|ID\|a\|b\|xG\|yG\|xQ\|yQ)$, $R=SM3(Z, x\Pi\|y\Pi)$ mod q;

B. calculating $e=SM3(R\|M)$;

C. randomly generating an integer z which satisfies $0<z<q$;

D. calculating $\Lambda=[z]G$;

E. calculating $r=(e+x\Lambda)$ mod q, $w=(z-r*S)/(S+1)$ mod q, the SM2 signing $U=(r, w)$;

F. generating an identification signature $(U=(r, w), \Pi)$.

S140, the verifying side verifies the correctness of the signature $(U=r, w), \Pi)$ of the message M generated by ID. The step S140 includes following steps:

A. calculating $Z=SM3$ $(ID\_LEN\|ID\|a\|b\|xG\|yG\|xQ\|yQ)$, $R=SM3$ $(Z, x\Pi\|y\Pi)$ mod q;

B. calculating $e=SM3(R\|M)$;

C. calculating $Q=\Pi-[R]H$;

D. calculating $t=(r+w)$ mod q;

E. calculating $V=[w]G+[t]Q$;

F. calculating $h=(e+xV)$; mod q;

G. checking whether h is equal to r, if they are equal, the signature is correct, otherwise the signature is wrong.

The present invention also provides a second specific embodiment, a signature method thereof is a signature method based on the ECDSA, and the details of the signature method are as follows:

S210, a signature side randomly generates an integer n which satisfies $0<n<q$, calculates $X=[n]G$, and provides the X and the signature side' own identification ID to a key generation center.

S220, the key generation center selects the EC-Schnorr signature algorithm as a signature method MA. A elliptic curve E: $Y^2=X^3+a*X+b$ specified in the SM2 standard is selected, a point group of order q on the elliptic curve E as the cyclic group is selected, a generator G is randomly selected, an integer ms satisfying $0<ms<q$ is randomly generated, $H=[ms]G$ is calculated, and a system parameter $P=<G, H=[ms]G>$ is set.

The steps of the key generation center generating the partial signature private key T corresponding to the ID are as follows:

A. the key generation center randomly generates an integer k satisfying $0<k<q$;

B. the key generation center calculates a pre-signature $\Pi=[k]G+[n]G$;

C. the key generation center calculates $Z=SHA256$ $(ID\_LEN\|ID\|a\|b\|xG\|yG\|xQ\|yQ)$, calculates a signature assignment value $R=SHA256$ $(Z, x\Pi\|y\Pi)$ mod q, wherein, ID_LEN is the length of ID, xG, yG, etc. represent values of x-axis and y-axis corresponding to point G, etc.; the SHA256 (A,B) is a summary of the connection values of A and B calculated by using the SHA256 algorithm, and the connection method is $A\|B$ or $B\|A$;

D. the key generation center calculates the second part of a signature value $w=(k+R*ms)$ mod q, correspondingly, a calculation process of Q is $Q=\Pi+[R]H$;

E. the key generation center generates the partial signature private key $T=(\Pi, w)$.

S230, the signature side calculates $S=(w+n)$ mod q, sets $PX=\Pi$, generates a signature key pair $(\Pi, S)$, and uses the ECDSA algorithm as MB to sign a message M. The step S230 includes the following steps:

A. calculating $Z=SHA256$ $(ID\_LEN\|ID\|a\|b\|xG\|yG\|xQ\|yQ)$, $R=SHA256$ $(Z, x\Pi\|y\Pi)$ mod q;

B. calculating $e=SHA256$ $(R\|M)$;

C. randomly generating an integer z which satisfies $0<z<q$;

D. calculating $\Lambda=[z]G$;

E. calculating $r=x\Lambda$ mod q, $w=(r*(S+n)+e)/z$ mod q, the ECDSA signing $U=(r, w)$;

F. generating an identification signature $(U=(r, w), \Pi)$.

S240, the verifying side verifies the correctness of the signature (U=(r, w), Π) of the message M generated by ID. The step S240 includes the following steps:
  A. calculating Z=SHA256 (ID_LEN∥ID-∥a∥b∥xG∥yG∥xQ∥yQ), R=SHA256 (Z, xΠ∥yΠ) mod q;
  B. calculating Q=Π+[R]H;
  C. calculating e=SHA256 (R∥M);
  D. calculating u=e/w mod q, v=r/w;
  E. calculating V=[u]G+[v]Q;
  F. calculating h=xV mod q;
  G. checking whether h is equal to r, if they are equal, the signature is correct, otherwise the signature is wrong.

The present invention also provides a third specific embodiment, a signature method thereof is a signature method based on the ECDSA, and the details of the signature method are as follows:

S310, a signature side randomly generates an integer n which satisfies 0<n<q, calculates X=[n]G, and provides the X and the signature sides own identification ID to a key generation center.

S320, the key generation center selects the EC-Schnorr deformation signature algorithm as a signature method MA. A elliptic curve E: Y^2=X^3+a*X+b specified in the SM2 standard is selected, a point group of order q on the elliptic curve E as the cyclic group is selected, a generator G is randomly selected, an integer ms satisfying 0<ms<q is randomly generated H=[ms]G is calculated, and a system parameter P=<G, H=[ms]G> is set.

The steps of the key generation center generating the partial signature private key T corresponding to ID are as follows:
  A. the key generation center calculates k=SHA256 (ID∥G∥H∥[n]G, ms);
  B. the key generation center calculates a pre-signature Π=[k]G+[n]G;
  C. the key generation center calculates Z=SHA256 (xG∥yg∥xQ∥yQ∥ID), and calculates a signature assignment value R=SHA256 (Z, xΠ∥yΠ) mod q, wherein xG, yG, etc. represent values of x-axis and y-axis corresponding to point G, etc.; SHA256(A,B) is a summary of the connection values of A and B calculated by using the SHA256 algorithm, and the connection method is A∥B or B∥A;
  D. the key generation center calculates the second part of a signature value w=(R*k+ms) mod q, correspondingly, a calculation process, of Q is Q=Π+[R]H;
  E. the key, generation center generates the partial signature private key T=(Π, w);
  F. the key, generation center uses X as a public key, uses the ECIES to encrypt w, and outputs ciphertext C;
  G. the signature side uses n as a private key to decrypt C and obtains w according to the ECIES decryption method.

S330, the signature side calculates S=(w+R*n) mod q, sets PX=Π, generates a signature key pair (Π, S), and uses the ECDSA algorithm as MB to sign a message M. The step S330 includes the following steps:
  A. calculating Z=SHA256 (xG∥yG∥xQ∥yQ∥ID), R=SHA256 (Z, xΠ∥yΠ) mod q;
  B. calculating e=SHA256 (R∥M);
  C. randomly generating an integer z which satisfies 0<z<q;
  D. calculating Λ=[z]G;
  E. calculating r=xΛ mod q, w=(r*(S+R*n)+e)/z mod q, the ECDSA signing U=(r,w);
  F. generating an identification signature (U=(r, w), Π).

S340, the verifying side verifies the correctness of the signature (U=(r, w), Π) of the message M generated by ID. The step S340 includes following steps:
  A. calculating Z=SHA256 (xG∥yG∥xQ∥yQ∥ID), R=SHA256 (Z, xΠ∥yΠ)mod q;
  B. calculating Q=[R]Π+H;
  C. calculating e=SHA256 (R∥M);
  D. calculating u=e/w mod q, v=r/w;
  E. calculating V=[u]G+[v]Q;
  F. calculating h=xV mod q;
  G. checking whether h is equal to r, if they are equal, the signature is correct, otherwise the signature is wrong.

The present invention also provides a fourth specific embodiment, a signature method thereof is a signature method based on the EC-SDSA, and the details of the signature method are as follows:

S410, a signature side randomly generates an integer n which satisfies 0<n<q, calculates X=[n]G, and provides the X and the signature side's own identification ID to a key generation center.

S420, the key generation center selects the EC-Schnorr signature algorithm as a signature method MA. A elliptic curve E: Y^2=X^3+a*X+b specified in the SM2 standard is selected, a point group of order q on the elliptic curve E as the cyclic group is selected, a generator G is randomly selected, an integer ms satisfying 0<ms<q is randomly generated, H=[ms]G is calculated, and a system parameter P=<G, H=[ms]G> is set.

The steps of the key generation center generating the partial signature private key T corresponding to ID are as follows:
  A. the key generation center randomly generates an integer k satisfying 0<k<q;
  B. the key generation center calculates a pre-signature Π=[k]G+[n]G;
  C. the key generation center calculates Z=SHA256 (ID_LEN∥ID∥a∥b∥xG∥yG∥xQ∥yQ), calculates a signature assignment value R=SHA256 (Z, xΠ∥yΠ) mod q, wherein ID_LEN is the length of ID, xG, yG, etc. represent values of x-axis and y-axis corresponding to point G, etc.;
  D. the key generation center calculates the second part of a signature value w=(k+R*ms) mod q, correspondingly, a calculation process of Q is Q=Π+[R]H;
  E. the key generation center generates the partial signature private key T=(Π, w).

S430, the signature side calculates S=(w+n) mod q, sets PX=Π, generates a signature key pair (Π, S), and uses the EC-SDSA algorithm as MB to sign a message M. The step S430 includes the following steps:
  A. calculating Z=SHA256 (ID_LEN∥ID-∥a∥b∥xG∥yG∥xQ∥yQ), R=SHA4256 (Z, xΠ∥yΠ) mod q;
  B. random generating an integer z which satisfies 0<z<q;
  C. calculating Λ=[z]G;
  D. calculating e=SHA256 (Λ∥R∥M);
  E. calculating r=e, w=(z+e*S) mod q; the EC-SDSA signing U=(r, w);
  F. generating a signature U=(r, w).

S440, the verifying side verifies the correctness of the signature U=(r, w) of the message M generated by ID. The step S440 includes the following steps:
  A. obtaining a signed public key Π disclosed by ID;
  B. calculating Z=SHA256 (ID_LEN∥ID-∥a∥b∥xG∥yG∥xQ∥yQ), R=SHA256 (Z, xΠ∥yΠ) mod q;
  C. calculating Q=Π+[R]H;
  D. calculating Λ=[w]G+[r]Q;
  E. calculating e=SHA256 (Λ∥R∥M);
  F. checking whether e is equal to r, if they are equal, the signature is correct, otherwise the signature is wrong.

The present invention also provides a fifth specific embodiment, a signature method thereof is a signature method based on the SM2, and the details of the signature method are as follows:

S510, a signature side random generates an integer n which satisfies 0<n<q, calculates X=[n]G, and provides the X and the signature side's own identification ID to a key generation center.

S520, the key generation center selects the EC-Schnorr signature algorithm as a signature method MA. A elliptic curve E: Y^2=X^3+a*X+b specified in the SM2 standard is selected, a point group of order q on the elliptic curve E as the cyclic group is selected, a generator G is randomly selected, an integer ms satisfying 0<ms<q is randomly generated H=[ms]G is calculated, and a system parameter P=<G, H=[ms]G> is set.

The steps of the key generation center generating the partial signature private key T corresponding to ID are as follows:

A. the key generation center randomly generates an integer k satisfying 0<k<q;

B. the key generation center calculates a pre-signature Π=[k]G;

C. the key generation center calculates Z=SM3 (ID_LEN∥ID∥a∥b∥xG∥yG∥xQ∥yQ∥xX∥yX); and calculates a signature assignment value R=SM3 (Z, xΠ∥yΠ) mod q;

D. the key generation center calculates the second part of a signature value w=(k−R*ms) mod q, correspondingly, a calculation process of Q is Q=Π+X−[R]H;

E. the key generation center generates the partial signature private key T=(Π, w).

S530, the signature side calculates S=(w+n) mod q, sets PX=(ΠX), generates a signature key pair all ((Π, X), S), and uses the SM2 algorithm as MB to sign a message M. The step S530 includes the following steps:

A. calculating Z=SM3 (ID_LEN∥ID∥a∥b∥xG∥yG∥xQ∥yQ∥xX∥yX), R=SM3 (Z, xΠ∥yΠ) mod q;

B. calculating e=SM3 (R∥M);

C. randomly generating an integer z which satisfies 0<z<q;

D. calculating Λ=[z]G;

E. calculating r=(e+xΛ) mod q, w=(z−r*S)/(S+1) mod q, the SM2 signing U=(r, w);

F. generating an identification signature (U=(r, w), (Π, X)).

S540, the verifying side verifies the correctness of the signature (U=(r, w), (Π, X)) of the message M generated by ID. The step S540 includes the following steps:

A. calculating Z=SM3 (ID_LEN∥ID∥a∥b∥xG∥yG∥xQ∥yQ∥xX∥yX), R=SM3 (Z, xΠ∥yΠ) mod q;

B. calculating e=SM3 (R∥M);

C. calculating Q=Π+X−[R]H;

D. calculating t=(r+w) mod q;

E. calculating V=[w]G+[t]Q;

F. calculating h=(e+xV) mod q;

G. checking whether h is equal to r, if they are equal, the signature is correct, otherwise the signature is wrong.

In the digital signature method of the present invention, during the process of performing the signature calculation defined by the signature algorithm MB to the message M, the signature assignment R calculated in the process of the key generation center performing the signature algorithm MA operation, is connected with the message M, to participate in the relevant operation instead of the original M, and in the signature verification process, the connection of R and M is used as the input in the operation requiring M as the input. The method can effectively resist attacks in the process of combining two signature algorithms, and the security of the signature method is improved.

The present invention also provides a sixth specific embodiment, a signature method thereof is a signature method based on the ECDSA deformation, and the details of the signature method are as follows:

S610, a signature side randomly generates an integer n which satisfies 0<n<q, calculates X=[n]G, and provides the X and the signature side's own identification ID to a key generation center.

S620, the key generation center selects the EC-Schnorr signature algorithm as a signature method MA. A elliptic curve E: Y^2=X^3+a*X+b specified in the SM2 standard is selected, a point group of order q on the elliptic curve E as the cyclic group is selected, a generator G is randomly selected, an integer ms satisfying 0<ms<q is randomly generated, H=[ms]G is calculated, and a system parameter P=<G, H=[ms]G> is set.

The steps of the key generation center generating the partial signature private key T corresponding to the ID are as follows:

A. the key generation center randomly generates an integer k satisfying 0<k<q;

B. the key generation center calculates a pre-signature Π=[k]G+[n]G;

C. the key generation center calculates Z=SHA256 (xG∥yG∥xQ∥yQ∥ID), and calculates a signature assignment value R=SHA256 (Z, xΠ∥yΠ) mod q, wherein xG, yG, etc. represent values of x-axis and y-axis corresponding to point G, etc.; SHA256(A,B) is a summary of the connection values of A and B calculated by using the SHA256 algorithm, and the connection method is A∥B or B∥A;

D. the key generation center calculates the second part of a signature value w=(k+R*ms) mod q, correspondingly, a calculation process of Q is Q=Π[R]H;

E. the key generation center generates the partial signature private key T=(Π, w).

S630, the signature side calculates S=(w+R*n) mod q, sets PX=Π, generates a signature key pair (Π, S), and uses the ECDSA deformation algorithm as MB to sign a message M. The step S630 includes the following steps:

A. calculating Z=SHA256 (xG∥yG∥xQ∥yQ∥ID), R=SHA256 (Z, xΠ∥yΠ) mod q;

B. randomly generating an integer z which satisfies 0<z<q;

C. calculating Λ=[z]G;

E. calculating r=xΛ, e=SHA256 (r∥∥R∥M), w=(r*(S+R*n)+e)/z mod q, the EDSA signing U=(r, w);

F. generating an identification signature. (U=(r, w), Π).

S640, the verifying side verifies the correctness of the signature (U=(r, w), Π) of the message M generated by ID. The step S640 includes the following steps:

A. calculating Z=SHA256(xG∥yG∥xQ∥yQ∥ID), R=SHA256(Z, xΠ∥yΠ) mod q;

B. calculating Q=[R]Π+H;

C. calculating e=SHA256(r∥R∥M);

D. calculating u=e/w mod q, v=r/w;

E. calculating V=[u]G+[v]Q;

F. calculating h=xV;

G. checking whether h is equal to r, if they are equal, the signature is correct, otherwise the signature is wrong.

Figure 4:
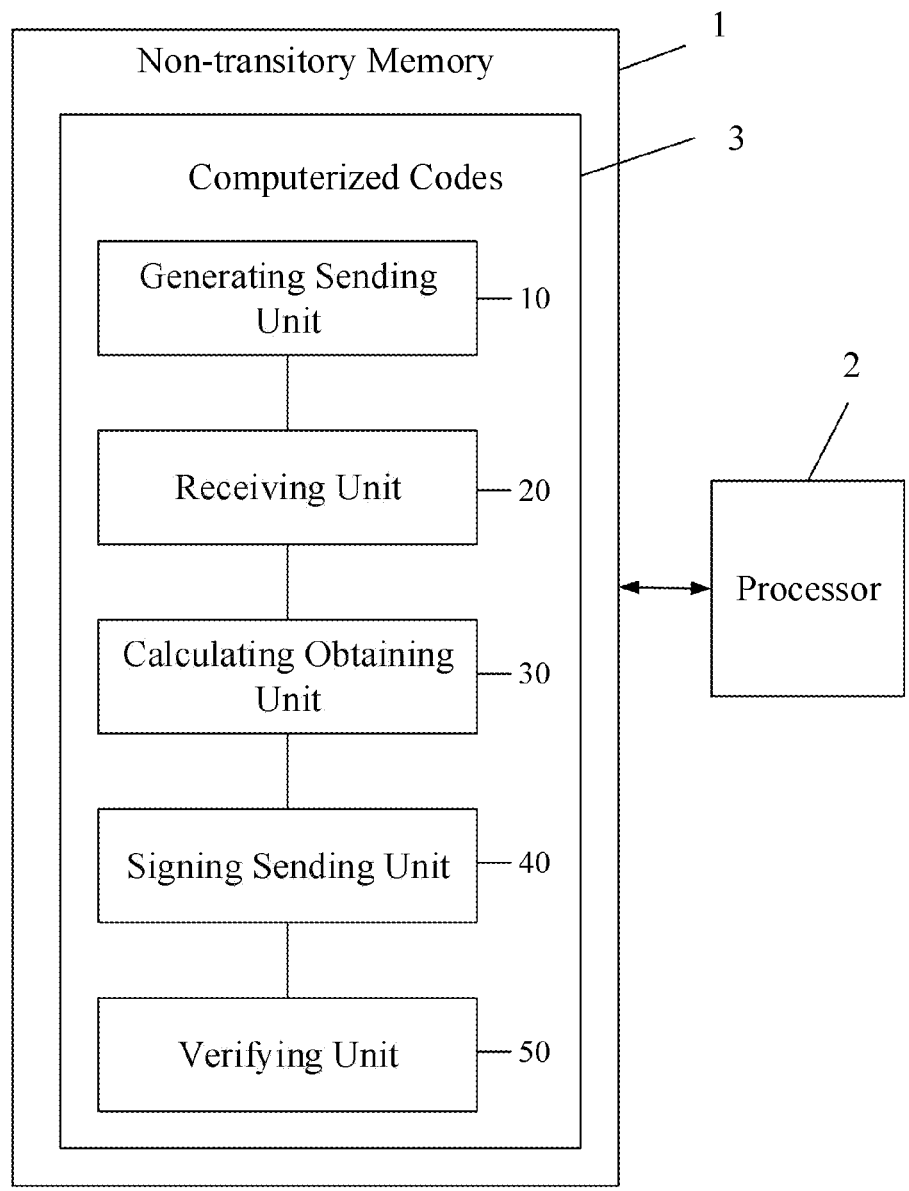
FIG. 4 is a schematic block diagram of a digital signature device according to an embodiment of the present invention.

Referring to FIG. 4, an embodiment of the present invention also provides a digital signature device corresponding to the digital signature method above. The digital signature device includes a non-transitory memory 1, a processor 2 electronically coupled to the non-transitory memory 1, and computerized codes 3 stored in the non-transitory memory 1 and executable by the processor 2. The computerized codes 3 includes instructions for implementing the following functional units:

a generating sending unit 10, used for randomly generating, by a signature side, a key pair n and X, and submitting an identification ID of the signature side and X to a key generation center;

a receiving unit 20, used for receiving a partial signature private key T=(Π, w) corresponding to the identification ID of the signature side generated by the key generation center; wherein, the (Π, w) is a signature value obtained by the key generation center performing a digital signature method MA to sign the ID; the key generation center randomly generates a signature public-private key pair (P, ms), generates a pre-signature Π, then generates a hash digest as a signature assignment R, and finally generates the second part w of the signature value, the hash digest of a message includes at least Π and ID; and the key generation center takes P as a public parameter of a cryptosystem;

a calculating obtaining unit 30, used for calculating and obtaining a signature key pair (PX, S) by using the P, the ID, the T, the n, and the X;

a signing sending unit 40, used for signing a message M by using S as a signature private key to execute a digital signature method MB, generating a signature value U, and passing (U, PX) as a signature value of the message M signed by the signature side to a verifying side, or sending U as the signature value of the message M signed by the signature side to the verifying side and publishing PX; and wherein, during a process of signing the message M, an operation requiring M as input uses a concatenation of R and M as input;

a verifying unit 50, used for verifying, by the verifying side, the signature of the message M; wherein, the verifying side obtains PX, calculates a public key Q corresponding to S according to the P, the ID, and the PX, and verifies whether U is a valid signature of the message M signed based on a private key corresponding to the public key Q, according to a signature verification process of the digital signature method MB, wherein, during a process of verifying signature, an operation requiring M as input uses a concatenation of R and M as input.

The digital signature method MA above is a signature method based on a discrete logarithm problem; the key generation center is constructed based on the discrete logarithm problem, the key generation center selects a generator G of a cyclic group of order q and a random element [o]G in the cyclic group, wherein, [o]G denotes the o multiple of G according to operation rules of the cyclic group; the ms in the signature public-private key pair (P, ms) is an integer ms randomly generated by the key generation center and satisfies 0<ms<q, and P=<G, H=[ms]G>.

In this embodiment, the digital signature device further includes: a decrypting unit 60, used for using, by the signature side, the n to decrypt an information including w encrypted based on a standard asymmetric encryption algorithm by the key generation center, wherein, when the standard asymmetric encryption algorithm encrypts the information includes w, a used encryption public key is X.

Figure 5:
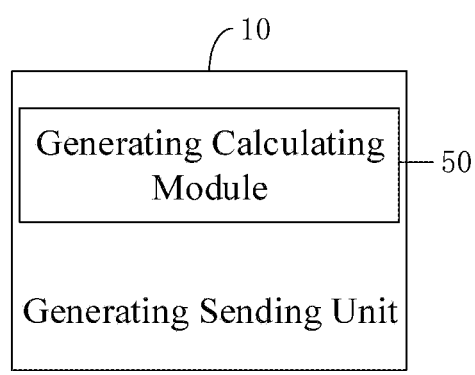
FIG. 5 is a schematic block diagram of a generating sending unit according to an embodiment of the present invention.

Referring to FIG. 5, in this embodiment, the generating sending unit 10, includes:

a generating calculating module 11, used for randomly generating an integer n which satisfies 0<n<q, and calculating X=[n]G.

Figure 6:
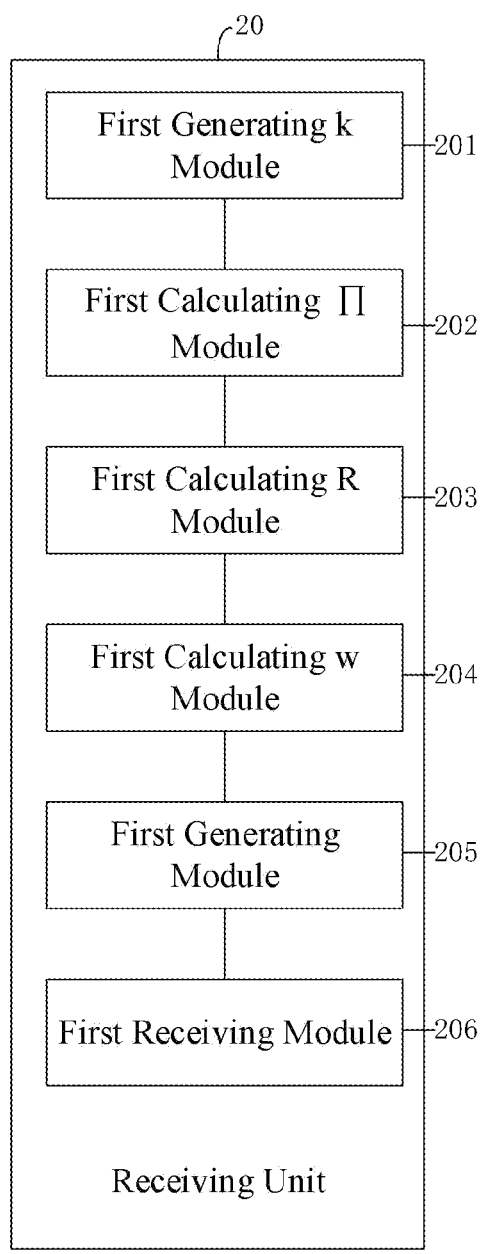
FIG. 6 is a schematic block diagram of a receiving unit according to an embodiment of the present invention.

Referring to FIG. 6, in this embodiment, the receiving unit 20, includes:

a first generating k module 201, used for randomly generating, by the key generation center, an integer k which satisfies 0<k<q, or calculating and obtaining k=HASH (F (ID, other information I), ms) mod q; wherein the other information I includes generating information of the cyclic group, G, H, and X an operation of F is a hash operation or a string concatenation, wherein, HASH (F (ID, other in information I), ms) is a hash digest for a concatenation of F(ID, other information I) and ms or ms and F(ID, other information I), or a HMAC result with ms as a secret key of message F(ID, other information I);

a first calculating Π module 202, used for calculating, by the key generation center, the pre-signature Π=[k]G±[n]G;

a first calculating R module 203, used for calculating, by the key generation center, the signature assignment R=HASH (F (ID, other information A), Π), wherein the other information A includes H;

a first calculating w module 204, used for calculating, by the key generation center, the second part of the signature value w=(k±R*ms) mod q or (R*k±ms) mod q;

a first generating module 205, used for generating, by the key generation center, the partial signature private key T=(Π, w);

a first receiving module 206, used for receiving the partial signature private key T=(Π, w).

The calculating obtaining unit 30, includes: a first calculating generating module, used for when w=(k±R*ms) mod q, S=(w±n) mod q. PX=Π, generating the signature key pair (PX, S), and the corresponding public key Q=Π±[r]H; and when w=(R*k±ms) mod q, S=(w±R*n) mod q, PX=Π, generating the signature key pair (PX, S), and the corresponding public key Q=[R]Π±H.

Figure 7:
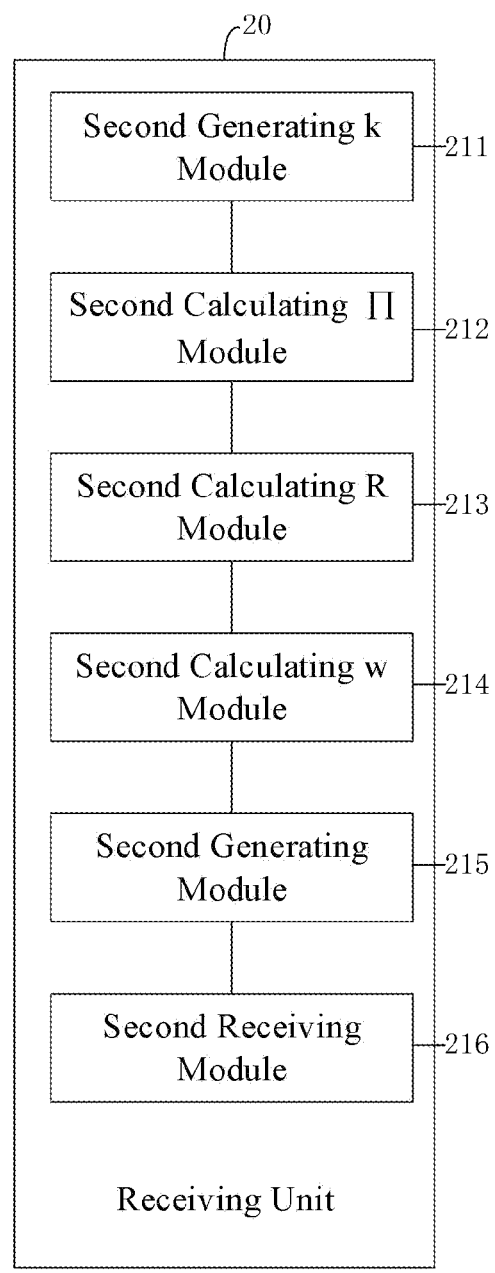
FIG. 7 is a schematic block diagram of a receiving unit according to another embodiment of the present invention.

Referring to FIG. 7, in another embodiment, the receiving unit 20, includes:

a second generating k module 211, used for randomly generating, by the key generation center, an integer k which satisfies 0<k<q, or calculating and obtaining k=HASH (F (ID, other information I), ms) mod q, wherein the other information I includes H and X, an operation of F is a hash operation or a string concatenation, wherein, HASH (F (ID, other information I), ms) is a hash digest for a concatenation of F(ID, other information I) and ms or ms and F(ID, other information I), or a HMAC result with ms as a secret key of message F(ID, other information I);

a second calculating Π module 212, used for calculating, by the key generation center, the pre-signature Π=[k]G;

a second calculating R module 213, used for calculating, by the key generation center, the signature assignment R=HASH (F (ID, other information A), Π) mod q, wherein the other information A includes X and H;

a second calculating w module 214, used for calculating, by the key generation center, the second part of the signature value w=(k±R m) mod q or (R*k±ms) mod q;

a second generating module 215, used for generating, by the key generation center, the partial signature private key T=(Π, w);

a second receiving module 216, used for receiving the partial signature private key T=(Π, w).

The calculating obtaining unit 30, includes: a second calculating generating module, used for when w=(k±R*ms) mod q, S=(w±n) mod q, PX=(Π, X), generating the signature key pair (PX, S) and the corresponding public key Q=Π±X±[R]H; and when w=(R*k±ms) mod q, S=(w±R*n) mod q. PX=(Π, X), generating the signature key pair (PX, S) and the corresponding public key Q=[R](Π±X)±H.

In the digital signature method of the present invention, during the process of performing the signature calculation defined by the signature algorithm MB to the message M, the signature assignment R calculated in the process of the key generation center performing the signature algorithm MA operation, is connected with the message M, to participate in the relevant operation instead of the original M, and in the signature verification process, the connection of R and M is used as the input in the operation requiring M as the input. The method can effectively resist attacks in the process of combining two signature algorithms, and the security of the signature method is improved.

Figure 8:
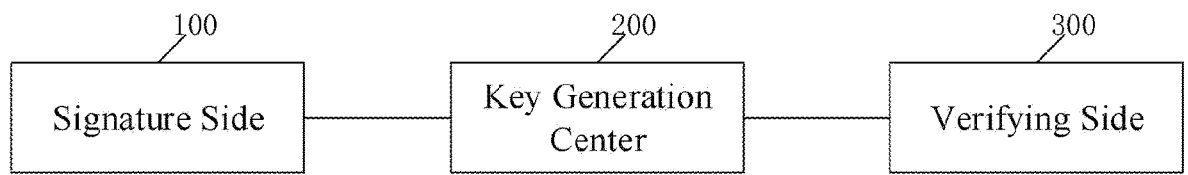
FIG. 8 is a schematic block diagram of a digital signature system according to an embodiment of the present invention.

Referring to FIG. 8, the embodiment of the present invention also provides a digital signature system corresponding to the digital signature method. The digital signature system includes a signature side 100, a key generation center 200, and a verifying side 300; wherein the signature side 100 randomly generates a key pair n and X, and submits an ID and X to the key generation center 200;

the key generation center 200 performs a preset digital signature method MA to sign the identification ID, the process of signing the identification ID includes: the key generation center 200 randomly generating a signature public-private key pair (P, ms), generating a pre-signature Π, generating a hash digest of a message including at least Π and ID as a signature assignment R, finally generating the second part w of the signature value, obtaining a signature value (Π, w) including two parts, taking the signature value as a partial signature private key T=(Π, w), and sending the partial signature private key T to the signature side 100 and the key generation center further taking P as a public parameter of a cryptosystem;

the signature side 100 calculates and obtains a signature key pair (PX, S) by using the P, the ID, the T, the n, and the X; signs a message M by using S as the signature private key to execute a digital signature method MB, generates a signature value U, and passes (V, PX) as a signature value of the message M signed by the signature side to the verifying side 300, or sends U as the signature value of the message M signed by the signature side 100 to the verifying side 300 and publishes PX; and wherein, during a process of signing the message M, an operation requiring the M as input uses a concatenation of R and M as input;

the verifying side 300 verifies a signature of the message M; a process of verifying the signature of the message M includes: obtaining PX, calculating a public key Q corresponding to S according to the P, the ID, and the PX, and verifying whether U is a valid signature of the message M signed based on a private key corresponding to the public key Q, according to a signature verification process of the digital signature method MB, wherein, during the process of verifying signature, an operation requiring M as input uses a concatenation of R and M as input.

In the digital signature system of the present invention, during, the process of performing the signature calculation defined by the signature algorithm MB to the message M, the signature assignment R calculated in the process of the key generation center 200 performing, the signature algorithm MA operation, is connected with the message M, to participate in the relevant operation instead of the original M, and in the signature verification process, the connection of R and M is used as the input in the operation requiring M as the input. The method can effectively resist attacks in the process of combining two signature algorithms, and the security of the signature method is improved.

The above are only preferred embodiments of the present invention, and thus do not limit the patent scope of the present invention, any equivalent structure or equivalent process transformation made by using the description and drawings of the present invention, or directly or indirectly used in other related technical fields, is equally included in the scope of patent protection.

What is claimed is:

1. A digital signature method, comprising:
a signature side randomly generating a key pair n and X, and submitting an identification ID of the signature side and X to a key generation center;
receiving a partial signature private key T=(Π, w) corresponding to the identification ID of the signature side generated by the key generation center; and wherein, the (Π, w) is a signature value obtained by the key generation center performing a digital signature method MA to sign the ID; the key generation center randomly generates a signature public-private key pair (P, ms), generates a pre-signature Π, then generates a hash digest as a signature assignment R, and finally generates a second part w of the signature value, wherein the hash digest of a message comprises at least Π and ID; and the key generation center takes P as a public parameter of a cryptosystem;
calculating and obtaining a signature key pair (PX, S) by using the P, the ID, the T, the n, and the X;
signing a message M by using S as a signature private key to execute a digital signature method MB, generating a signature value U, and passing (U, PX) as a signature value of the message M signed by the signature side to a verifying side, or sending U as the signature value of the message M signed by the signature side to the verifying side and publishing PX; and wherein, during a process of signing the message M, an operation requiring M as input uses a concatenation of R and M as input; and
verifying, by the verifying side, a signature of the message M; wherein, the verifying side obtains PX, calculates a public key Q corresponding to S according to the P, the ID, and the PX, and verifies whether U is a valid signature of the message M signed based on a private key corresponding to the public key Q, according to a signature verification process of the digital signature method MB, wherein, during a process of verifying signature, an operation requiring M as input uses a concatenation of R and M as input.

2. The digital signature method as claimed in claim 1, wherein, the digital signature method MA is a signature method based on a discrete logarithm problem; the key generation center is constructed based on the discrete logarithm problem, the key generation center selects a generator G of a cyclic group of order q and a random element [o]G in the cyclic group, wherein [o]G denotes the o multiple of G according to operation rules of the cyclic group;
ms in the signature public-private key pair (P, ms) is an integer ms randomly generated by the key generation center and satisfies 0<ms<q, and P=<G, H=[ms]G>.

3. The digital signature method as claimed in claim 2, wherein, before the step of calculating and obtaining the signature key pair (PX, S) by using the P, the ID, the T, the n, and the X, comprises:
the signature side using the n to decrypt an information comprising w encrypted based on a standard asymmetric encryption algorithm by the key generation center, wherein, when the standard asymmetric encryption algorithm encrypts the information comprises w, a used encryption public key is X.

4. The digital signature method as claimed in claim 2, wherein a method of the signature side randomly generating the key pair n and X, comprises:

the signature side randomly generating an integer n which satisfies 0<n<q, and calculating X=[n]G.

5. The digital signature method as claimed in claim 4, wherein the step of receiving the partial signature private key T=(Π, w) corresponding to the identification ID of the signature side generated by the key generation center, specifically comprises:

randomly generating, by the key generation center, an integer k which satisfies 0<k<q, or calculating and obtaining k=HASH (F (ID, other information I), ms) mod q, the other information I comprising H and X, an operation of F being a hash operation or a string concatenation, wherein, HASH (F (ID, other information I), ms) is a hash digest for a concatenation of F(ID, other information I) and ms or ms and F(ID, other information I), or a HMAC result with ms as a secret key of message F(ID, other information I);

calculating, by the key generation center, the pre-signature Π=[k]G±[n]G;

calculating, by the key generation center, the signature assignment R=HASH (F (ID, other information A), Π), and the other information A comprising H;

calculating, by the key generation center, the second part of the signature value w=(k±R*ms) mod q or (R*k±ms) mod q;

generating, by the key generation center, the partial signature private key T=(Π, w);

receiving the partial signature private key T=(Π, w).

6. The digital signature method as claimed in claim 5, wherein, the step of calculating and obtaining the signature key pair (PX, S) by using the P, the ID, the T, the n, and the X, comprises:

when w=(k±R*ms) mod q, S=(w±n) mod q, PX=Π, generating the signature key pair (PX, S), and the corresponding public key Q=Π±[R]H;

when w=(R*k±ms) mod q, S=(w±R*n)mod q, PX=Π, generating the signature key pair (PX, S), and the corresponding public key Q=[R]Π±H.

7. The digital signature method as claimed in claim 4, the step of receiving the partial signature private key T=(Π, w) corresponding to the identification ID of the signature side generated by the key generation center, specifically comprises:

randomly generating, by the key generation center, an integer k which satisfies 0<k<q, or calculating and obtaining k=HASH (F (ID, other information I), ms) mod q, the other information I comprising H and X, an operation of F being a hash operation or a string concatenation, wherein, HASH (F (ID, other information I), ms) is a hash digest for a concatenation of F(ID, other information I) and ms or ms and F(ID, other information I), or a HMAC result with ms as a secret key of message F(ID, other information I);

calculating, by the key generation center, the pre-signature Π=[k]G;

calculating, by the key generation center, the signature assignment R=HASH (F (ID, other information A), Π) mod q, and the other information A comprising X and H;

calculating, by the key generation center, the second part of the signature value w=(k±R*ms) mod q or (R*k±ms) mod q;

generating, by the key generation center, the partial signature private key T=(Π, w);

receiving the partial signature private key T=(Π, w).

8. The digital signature method as claimed in claim 7, wherein, the step of calculating and obtaining the signature key pair (PX, S) by using the P, the ID, the T, the n, and the X, comprises:

when w=(k±R*ms) mod q, S=(w±n) mod q, PX=(Π, X), generating the signature key pair (PX, S), and the corresponding public key Q=Π±X±[R]H;

when w=(R*k±ms) mod q, S=(w±R*n) mod q, PX=(Π, X), generating the signature key pair (PX, S), and the corresponding public key Q=[R](Π±X)±H.

9. A digital signature device, comprising:

a non-transitory memory;

a processor electronically coupled to the non-transitory memory; and computerized codes stored in the non-transitory memory and executable by the processor, wherein the computerized codes comprise:

instructions for randomly generating, by a signature side, a key pair n and X, and submitting an identification ID of the signature side and X to a key generation center;

instructions for receiving a partial signature private key T=(Π, w) corresponding to the identification ID of the signature side generated by the key generation center; wherein, the (Π, w) is a signature value obtained by the key generation center performing a digital signature method MA to sign the ID; the key generation center randomly generates a signature public-private key pair (P, ms), generates a pre-signature Π, then generates a hash digest as a signature assignment R, and finally generates a second part w of the signature value, wherein the hash digest of a message comprises at least Π and ID; and the key generation center takes P as a public parameter of a cryptosystem;

instructions for calculating and obtaining a signature key pair (PX, S) by using the P, the ID, the T, the n, and the X;

instructions for signing a message M by using S as a signature private key to execute a digital signature method MB, generating a signature value U, and passing (U, PX) as a signature value of the message M signed by the signature side to a verifying side, or sending U as the signature value of the message M signed by the signature side to the verifying side and publishing PX; and wherein, during a process of signing the message M, an operation requiring M as input uses a concatenation of R and M as input;

instructions for verifying, by the verifying side, a signature of the message M; wherein, the verifying side obtains PX, calculates a public key Q corresponding to S according to the P, the ID, and the PX, and verifies whether U is a valid signature of the message M signed based on a private key corresponding to the public key Q, according to a signature verification process of the digital signature method MB, wherein, during a process of verifying signature, an operation requiring M as input uses a concatenation of and M as input;

wherein, the digital signature method MA is a signature method based on a discrete logarithm problem; the key generation center is constructed based on the discrete logarithm problem, the key generation center selects a generator G of a cyclic group of order q and a random element [o]G in the cyclic group, wherein, [o]G denotes the o multiple of G according to operation rules of the cyclic group;

ms in the signature public-private key pair (P, ms) is an integer ms randomly generated by the key generation center and satisfies 0<ms<q, and P=<G, H=[ms]G>.

10. The digital signature device as claimed in claim 9, wherein, the computerized codes further comprise:
  instructions for by the signature side, the n to decrypt an information comprising w encrypted based on a standard asymmetric encryption algorithm by the key generation center, wherein, when the standard asymmetric encryption algorithm encrypts the information comprises w, a used encryption public key is X.

11. The digital signature device as claimed in claim 9, wherein, the instructions for randomly generating, by the signature side, the key pair n and X, and submitting the identification ID of the signature side and X to the key generation center comprise:
  instructions for randomly generating an integer n which satisfies 0<n<q, and calculating X=[n]G.

12. The digital signature device as claimed in claim 11, wherein, the processor executes the instructions for receiving the partial signature private key T=(Π, w) corresponding to the identification ID of the signature side generated by the key generation center which executes:
  instructions for randomly generating, by the key generation center, an integer k which satisfies 0<k<q, or calculating and obtaining k=HASH (F (ID, other information I), ms) mod q, the other information I comprising generating information of the cyclic group, G, H, and X, an operation of F being a hash operation or a string concatenation, wherein, HASH (F (ID, other information I), ms) is a hash digest for a concatenation of F(ID, other information I) and ms or ms and F(ID, other information I), or a HMAC result with ms as a secret key of message F(ID, other information I);
  instructions for calculating, by the key generation center, the pre-signature Π=[k]G±[n]G;
  instructions for calculating, by the key generation center, the signature assignment R=HASH (F (ID, other information A), Π), and the other information A comprising H;
  instructions for calculating, by the key generation center, the second part of the signature value w=(k±R*ms) mod q or (R*k±ms) mod q;
  instructions for generating, by the key generation center, the partial signature private key T=(Π, w).

13. The digital signature device as claimed in claim 12, wherein, the instructions for calculating and obtaining the signature key pair (PX, S) by using the P, the ID, the T, the n, and the X comprise:
  instructions for when w=(k±R*ms) mod q, S=(w±n) mod q, PX=Π, generating the signature key pair (PX, S), and the corresponding public key Q=Π±[R]H; and when w=(R*k±ms) mod q, S=(w±R*n) mod q, PX=Π, generating the signature key pair (PX, S), and the corresponding public key Q=[R]Π±H.

14. The digital signature device as claimed in claim 11, wherein, the processor executes the instructions for receiving the partial signature private key T=(Π, w) corresponding to the identification ID of the signature side generated by the key generation center which executes:
  instructions for randomly generating, by the key generation center, an integer k which satisfies 0<k<q, or calculating and obtaining k=HASH (F (ID, other information I), ms) mod q, the other information I comprising H and X, an operation of F being a hash operation or a string concatenation, wherein, HASH (F (ID, other information I), ms) is a hash digest for a concatenation of F(ID, other information I) and ms or ms and F(ID, other information I), or a HMAC result with ms as a secret key of message F(ID, other information I);
  instructions for calculating, by the key generation center, the pre-signature Π=[k]G;
  instructions for calculating, by the key generation center, the signature assignment R=HASH (F (ID, other information A), Π) mod q, and the other information A comprising X and H;
  instructions for calculating, by the key generation center, the second part of the signature value w=(k±R*ms) mod q or (R*k±ms) mod q;
  instructions for generating, by the key generation center, the partial signature private key T=(Π, w).

15. The digital signature device as claimed in claim 14, wherein, the instructions for calculating and obtaining the signature key pair (PX, S) by using the P, the ID, the T, the n, and the X comprise:
  instructions for when w=(k±R*ms) mod q, S=(w±n) mod q, PX=(Π, X), generating the signature key pair (PX, S) and the corresponding public key Q=Π±X±[R]H; and when w=(R*k±ms) mod q, S=(w±R*n) mod q, PX=(Π, X), generating the signature key pair (PX, S), and the corresponding public key Q=[R](Π±X)±H.

16. A digital signature system, comprising: a signature side, a key generation center, and a verifying side; wherein, the signature side is a signature device, the key generation center is a device for key management, and the verifying side is a device for verifying; and wherein,
  the signature side randomly generates a key pair n and X, and submits an ID and X to the key generation center;
  the key generation center performs a preset digital signature method MA to sign the identification ID, a process of signing the identification ID comprises: the key generation center randomly generating a signature public-private key pair (P, ms), generating a pre-signature Π, generating a hash digest of a message comprising at least Π and ID as a signature assignment R, finally generating a second part w of the signature value, obtaining a signature value (Π, w) comprising two parts, taking the signature value as a partial signature private key T=(Π, w), and sending the partial signature private key T to the signature side; and the key generation center further taking P as a public parameter of a cryptosystem;
  the signature side calculates and obtains a signature key pair (PX, S) by using the P, the ID, the T, the n, and the X; signs a message M by using S as the signature private key to execute a digital signature method MB, generates a signature value U, and passes (U, PX) as a signature value of the message M signed by the signature side to the verifying side, or sends U as the signature value of the message M signed by the signature side to the verifying side and publishes PX; and wherein, during a process of signing the message M, an operation requiring the M as input uses a concatenation of R and M as input;
  the verifying side verifies a signature of the message M; a process of verifying the signature of the message M comprises: obtaining PX calculating a public key Q corresponding to S according to the P, the ID, and the PX, and verifying whether U is a valid signature of the message M signed based on a private key corresponding to the public key Q, according to a signature verification process of the digital signature method MB, wherein, during the process of verifying signature, an operation requiring M as input uses a concatenation of R and M as input.

* * * * *